US009100869B2

(12) United States Patent
Nádas et al.

(10) Patent No.: US 9,100,869 B2
(45) Date of Patent: Aug. 4, 2015

(54) METHOD AND APPARATUS FOR GRANT-BASED UPLINK TRANSMISSION SCHEDULING

(75) Inventors: Szilveszter Nádas, Budapest (HU); László Hévizi, Piliscsaba (HU); Sándor Rácz, Cegléd (HU)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 386 days.

(21) Appl. No.: 13/580,840

(22) PCT Filed: Mar. 8, 2010

(86) PCT No.: PCT/SE2010/050254
§ 371 (c)(1),
(2), (4) Date: Aug. 23, 2012

(87) PCT Pub. No.: WO2011/112124
PCT Pub. Date: Sep. 15, 2011

(65) Prior Publication Data
US 2012/0320746 A1    Dec. 20, 2012

(51) Int. Cl.
H04L 12/26         (2006.01)
H04W 28/10        (2009.01)
H04L 12/825       (2013.01)

(52) U.S. Cl.
CPC .............. *H04W 28/10* (2013.01); *H04L 47/263* (2013.01)

(58) Field of Classification Search
None
See application file for complete search history.

(56) References Cited

U.S. PATENT DOCUMENTS

2005/0185583 A1* 8/2005 Hosein .................. 370/232
2007/0153695 A1* 7/2007 Gholmieh et al. .......... 370/235
2008/0310389 A1* 12/2008 Suzuki et al. ............... 370/346

FOREIGN PATENT DOCUMENTS

WO    2006075951 A1    7/2006
WO    2008066430 A1    6/2008

OTHER PUBLICATIONS

HSUPA Transport Network Congestion Control, Nadas et al, IEEE, 2008.*

(Continued)

*Primary Examiner* — Hassan Phillips
*Assistant Examiner* — Gautam Sharma
(74) *Attorney, Agent, or Firm* — Vincent J. Allen; Austin C. Teng; Carstens & Cahoon, LLP (57) ABSTRACT

In one aspect, the present invention advantageously provides far greater granularity in adjusting the maximum (schedulable) uplink bit rates of users than is directly available from a defined grant table that is used for making scheduled uplink grants to those users. As a non-limiting example, the EUL scheduler in a NodeB in a WCDMA network calculates the "effective" bit rate desired for one or more users over a given time interval, and determines the pattern of scheduling grants to make from the grant table over that interval, to produce the desired effective bit rate(s). This capability enables the EUL scheduler to make relatively fine fractional adjustments to the aggregate uplink data rate for a plurality of users, thus allowing much more precise reductions in the aggregate uplink data rate of those users. The EUL scheduler makes these more precise adjustments, for example, in response to indications of congestion on the backhaul connection between the NodeB and its supporting RNC. Grant variations also may be used in the HARQ processes of one or more users, for obtaining better bit rate control granularity.

16 Claims, 5 Drawing Sheets

(56) References Cited

OTHER PUBLICATIONS

Siemens, "E-DCH TNL Congestion Control with Soft Handover," TSG-RAN Working Group 3 meeting #51, R3-060266, Feb. 2006, Denver, USA.

Nádas, Szilveszter et al, "HSUPA Transport Network Congestion Control," EURASIP Journal on Wireless Communications and Networking, vol. 2009, Article ID 924096, 10 pages, Hindawi Publishing Corporation, Jun. 22, 2009, Budapest, Hungary.

* cited by examiner

METHOD AND APPARATUS FOR GRANT-BASED UPLINK TRANSMISSION SCHEDULING

TECHNICAL FIELD

The present invention generally relates to grant-based uplink transmissions, and particularly relates to achieving finer data rate control granularity than is otherwise afforded by entries in a defined grant table, such as for improved flow control on a backhaul link that carries uplink traffic for a plurality of users.

BACKGROUND

Using Wideband CDMA (WCDMA) standards and nomenclature as an example, a "Radio Network Controller" (RNC) receives uplink traffic from users supported by one or more "NodeBs" that are associated with the RNC. Each NodeB transmits downlink signals to and receives uplink signals from each user and the RNC in turn provides connectivity to the supporting Core Network (CN). In this context the term "user" denotes a cellular telephone or other item of user equipment.

Uplink enhancements specified in Release 6 and later 3GGP standards for WCDMA aim for performance improvements on the uplink, based primarily on deciding which users transmit on the uplink at which times. This uplink scheduling—referred to as "Enhanced UpLink" or "EUL"—provides increased system capacity and throughput through reductions in uplink interference, particularly among high-rate users.

NodeBs "schedule" user transmissions on the EUL using a scheduling "grant table" that includes a number of pre-defined numeric values, referred to as "table entries." Table entries are numeric values representing the maximum power that can be used by any given user, for transmitting on the Enhanced-Dedicated Physical Data Channel(s) or E-DPDCHs. Each NodeB schedules users for uplink transmissions by making absolute Grants from the grant table, or by making so called relative grants, which are relative to absolute grants. A user receiving an uplink grant uses the grant value to compute its "serving grant" based on the maximum power indicated by the grant, and other information provided to the user at connection setup. While the table entries are not literal data rate values, each entry maps to some maximum data rate for any given user, depending on a number of variables like the transport channel format(s) in use, the Transmit Time Interval (TTI) duration, etc.

In some instances, the air interface carrying the users' uplink transmissions is not the bottleneck as regards the overall throughput of uplink traffic for a given NodeB. Instead, the "transport network" on the backhaul side of the NodeB can become the point of congestion. Particularly, the backhaul links connecting the RNC to each NodeB may have an aggregate data throughput that is less than the best-case EUL throughput supported over the air interface by the NodeB. For example, connecting an RNC and a Node-B with a 2 Mbps link leaves that link susceptible to uplink congestion because the aggregate data rate supported by the EUL can easily exceed 2 Mbps. A network operator might nonetheless find good reasons to use a 2 Mbps link on the backhaul, such as cost, convenience, etc.

The known problem of transport network (TN) congestion in such cases has led to the advent of TN flow control, wherein the RNC monitors TN congestion levels (related to EUL traffic) and sends corresponding congestion indicators to the affected NodeBs. As one example, see Szilveszter Nádas, Zoltán Nagy and Sándor Rácz, "HSUPA transport network congestion control," (Presented at 4th IEEE Broadband wireless access workshop co-located with Globecom 2008), ETH-08:000588 Uen. The main goal of the EUL TN flow-control is to somehow adapt bit rates of the uplink data flows contributing to the congestion, as needed to relieve the congestion. Correspondingly, any given NodeB responds to congestion indicators by reducing the uplink data rates (bit rates) of at least some of the users it is supporting. To do so, the Node-B informs given users about their maximum allowed bit rates using absolute and relative grants.

The EUL scheduler in the NodeB assigns an absolute grant to the UE, and that grant is valid until a new absolute grant arrives. The user is allowed to send data with this granted rate—the absolute grant is expressed as an E-DPDCH/DPCCH power ratio, so it indirectly determines the user's maximum allowed uplink sending rate. Problematically, however, the grant table contains a limited number of possible grant rates. Hence, the scheduler's ability to "tune" its grant adjustments responsive to TN congestion indicators is limited.

SUMMARY

In one aspect, the present invention advantageously provides far greater granularity in adjusting the maximum uplink bit rates of users than is directly available from a defined grant table used for making scheduled uplink grants to those users. As a non-limiting example, the EUL scheduler in a NodeB in a WCDMA network calculates the "effective" bit rate desired for one or more users over a given time interval, and determines the pattern of scheduling grants to make from the grant table over that interval, to produce the desired effective bit rate(s). This capability enables the EUL scheduler to make relatively fine fractional adjustments to the aggregate uplink data rate for a plurality of users, thus allowing much more precise reductions in the aggregate uplink data rate of those users. The EUL scheduler makes these more precise adjustments, for example, in response to indications of congestion on the backhaul connection between the NodeB and its supporting RNC. Grant variations also may be used in the HARQ processes of given users, to obtain better bit rate control granularity.

With the above in mind, one embodiment of a method presented herein controls an aggregate bit rate of uplink traffic from a plurality of users supported by a node, to alleviate transport network congestion on a flow-controlled backhaul connection of the node. Here, the node controls the bit rate of uplink traffic from each user based on making uplink grants to the user according to a defined grant table, and the method includes receiving flow control signaling in cases of transport network congestion on the backhaul connection—the flow control signaling indicates a desired fractional reduction in the aggregate bit rate. The method further includes the node making uplink grants to one or more first users in the plurality of users, by dithering between two or more entries in the grant table for each first user, based on the desired fractional reduction in the aggregate bit rate. The dithering is done so as to cause an effective uplink bit rate for each first user to take on a value not directly obtainable from the grant table.

In another embodiment, a wireless communication network node is configured to control an aggregate bit rate of uplink traffic from a plurality of users supported by the node, to alleviate transport network congestion on a flow-controlled backhaul connection of the node. Again, the node controls the bit rate of uplink traffic from each user based on making uplink grants to the user according to a defined grant table.

The node comprises: a communication interface to receive flow control signaling in cases of transport network congestion on the backhaul connection, said flow control signaling indicating a desired fractional reduction in the aggregate bit rate; and a scheduling processor configured to make uplink grants to one or more first users in the plurality of users, by dithering between two or more entries in the grant table for each first user, based on the desired fractional reduction in the aggregate bit rate, so as to cause an effective uplink bit rate for each first user to take on a value not directly obtainable from the grant table.

Of course, the above summary of advantages and features is not limiting with respect to the present invention. For example, those skilled in the art will recognize additional features and advantages of the present invention upon reading the following detailed description, which highlights a number of example embodiments, and upon viewing the accompanying drawings.

DETAILED DESCRIPTION

Figure 1:
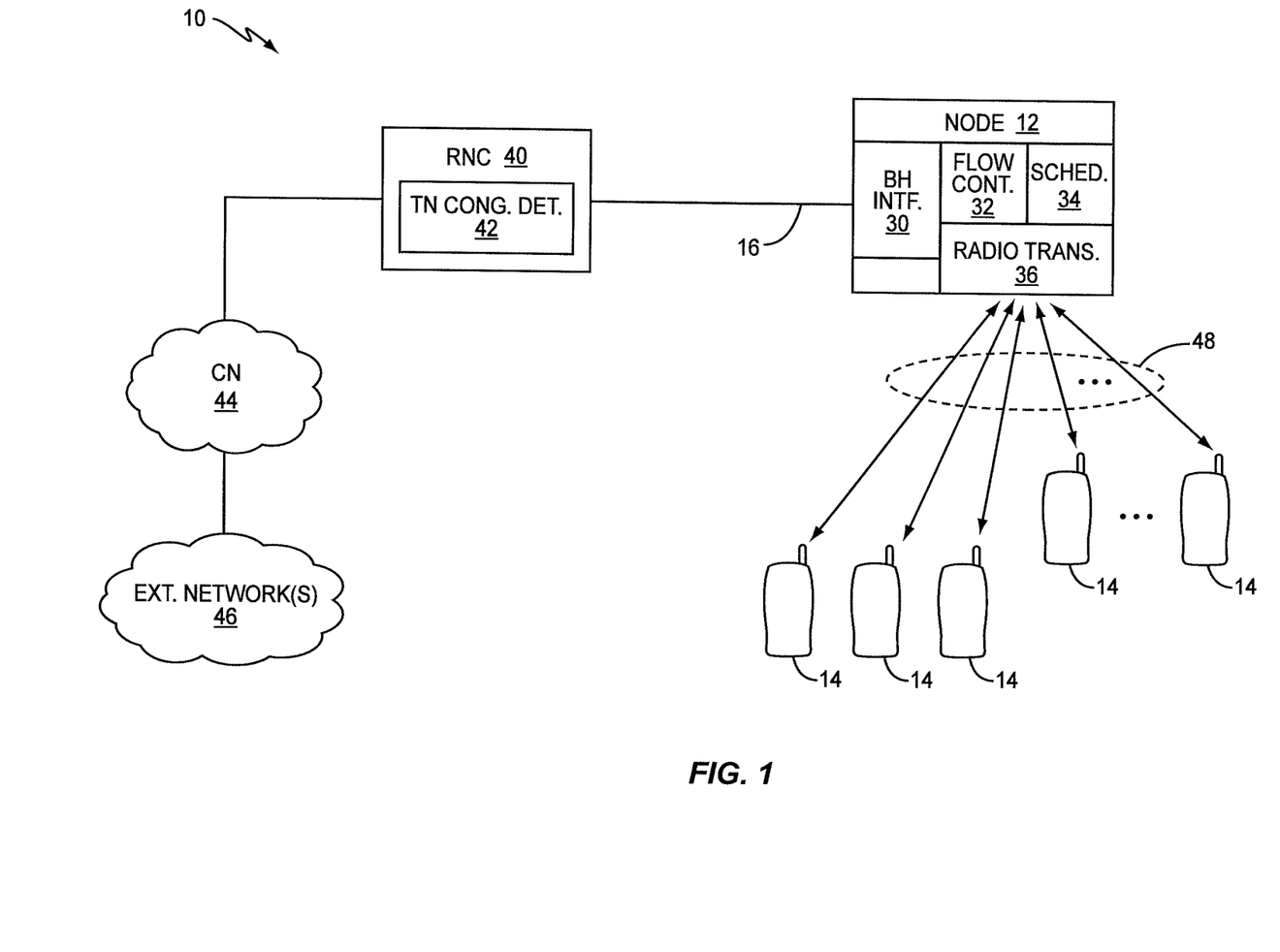
FIG. 1 is a block diagram of one embodiment of a wireless communication network.

FIG. 1 illustrates a wireless communication network 10 that includes a wireless communication network node 12 that is configured to control an aggregate bit rate of uplink traffic from a plurality of users 14 that are supported by the node. The node 12 exercises that control to alleviate transport network congestion on a flow-controlled backhaul connection 16 of the node 12.

Figure 2:
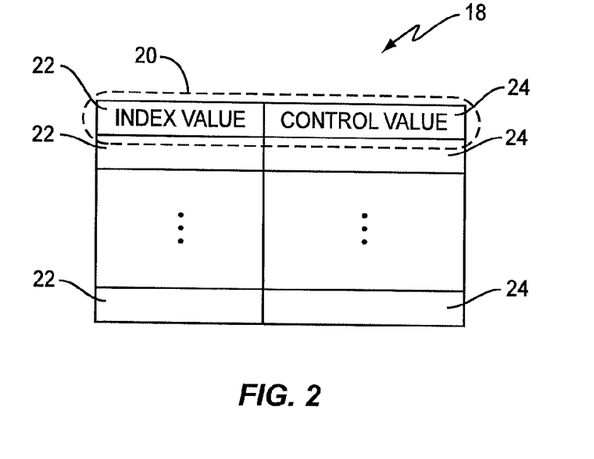
FIG. 2 is a diagram of one embodiment of a typical grant table used for making absolute grants to users on a scheduled uplink.

In normal operation, the node 12 controls the bit rate of uplink traffic from each user 14 based on making uplink grants to the user 14 according to a defined grant table 18 illustrated by way of example in FIG. 2. The grant table 18 may be a predefined data structure stored in memory or other non-volatile storage (both at the node 12 and at the individual users 14). In at least one embodiment, the grant table 18 includes a plurality of entries 20, with each entry identified by an index value 22 that is associated with a control value 24 that directly or indirectly sets the maximum uplink data rate for any given user 14. Note that the actual maximum bit rate mapped to by any given entry 20 in the table 18 may depend on, for example, the radio conditions of the involved user 14, the transport format(s) in use, and associated modulation and coding schemes.

Figure 3:
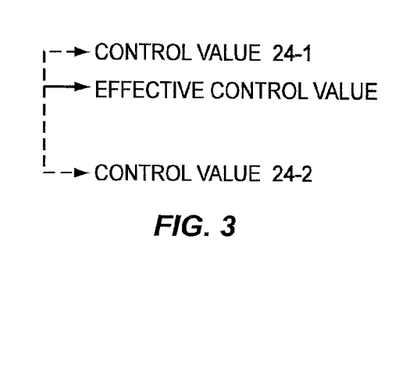
FIG. 3 is a diagram illustrating how an effective control value from a grant table, or, equivalently, how an effective maximum schedulable bit rate, can be obtained by dithering between two entries in a grant table.

Returning to the illustrated embodiment shown in FIG. 1, the node 12 comprises: a communication interface 30 to receive flow control signaling in cases of transport network congestion on the backhaul connection 16, said flow control signaling indicating a desired fractional reduction in the aggregate bit rate; and a scheduling processor 32 configured to make uplink grants to one or more first users in the plurality of users 14, by dithering between two or more entries 20 in the grant table 18 for each first user, based on the desired fractional reduction in the aggregate bit rate, so as to cause an effective uplink bit rate for each first user to take on a value not directly obtainable from the grant table 18. For example, see FIG. 3, wherein the node 12 makes a series of uplink grants to a given first user according to a combination of two grant values 24-1 and 24-2 from the grant table 18, where the combination of grant values is calculated by the node 12 to produce an effective control value (i.e., an effective maximum uplink bit rate) that lies between defined entries in the table 18.

Further describing example elements of the node 12 and the overall network 10 may help with better understanding such operations. To that end, the embodiment of FIG. 1 further depicts the node 12 as including a scheduling processor 34 and radio transceivers 36. The backhaul link 16 communicatively couples the node 12 to a radio network controller (RNC) 40, which includes a transport network (TN) congestion detector 42, and which communicatively couples to a core network (CN) 44 that in turn couples to one or more external network 46 (such as the Internet, the PSTN, etc.).

The illustrated arrangement communicatively couples the users 14 (which may be mobile terminals or other items of user equipment) to other communication devices or systems accessible via the external networks 46. The node 12 carries the traffic and control signaling flowing to and from the users 14 over its air interface 48, as supported by the transmitters and receivers included in its radio transceivers 36. One assumption in operation with respect to that support is that the node 12 and its air interface 48 can support uplink bit rates in the aggregate that exceed the maximum bit rate supported by the backhaul link 16 that carries uplink traffic from the plurality of users 14 to the RNC 40.

For example, the network 10 comprises a WideBand CDMA (WCDMA) network and the node 12 comprises a NodeB, wherein the scheduling processor 34 provides Enhanced Uplink (EUL) operation according to the WCDMA standards. Staying with the WCDMA context, the backhaul link 16 comprises an Iub interface that is limited to, for example, a maximum bit rate of 2 Mbps, a value that can be exceeded relatively easily by the aggregate of the traffic flowing from scheduled ones of the users 14 on the EUL of the air interface 48. However, the TN congestion detector 42 alleviates backhaul congestion by monitoring the backhaul link 16 and sending corresponding flow control commands to the flow controller 32 in the node 12, via the backhaul interface 30 of the node 12.

In at least one embodiment, the flow control indicators indicate a level of congestion on the backhaul link 16 or indicate a needed fractional reduction in the bit rate of the aggregate uplink traffic flowing from the node 12 to the RNC 40. For example, the TN congestion detector 36 detects actual or impending congestion on the backhaul link 16 caused by uplink traffic flowing from users 14 as supported and scheduled by the node 12, and it sends congestion control indicators to the flow controller 32 in the node 12, to cause the node 12 to reduce the total uplink bit rate of the users 14. In a particular example, the TN congestion detector 42 sends one or more flow control indicators to the node 12 that direct the node 12 to cause a desired fractional reduction in the (aggregate) uplink bit rate, e.g., a 5% or 10% reduction.

According to one or more embodiments of the node 12 and its flow controller 32 and scheduling processor 34, these fractional reductions in the aggregate uplink bit rate derive from the node's ability to dither between entries 20 in its (uplink) grant table 18 over a given granting period or interval so that the "effective" grant for that interval falls somewhere between the two table entries 20. This configuration allows the node 12 to make adjustments to the aggregate uplink bit rate that are essentially arbitrary, at least within the limits imposed by the minimum grant periods (Transmission Time Intervals or TTIs) and the number and values of the table entries 20. Note that for EUL/WCDMA embodiments, each table entry 20 contains or otherwise maps to an E-DPDCH/DPCCH power ratio (which is a traffic-to-pilot power ratio) that relates to the user's uplink data rate. That is, each table entry 20 may define a maximum traffic-to-pilot power ratio that directly or indirectly defines a maximum uplink data rate for any given user 14, in dependence on the particulars of that user's radio configuration and channel conditions.

Figure 4:
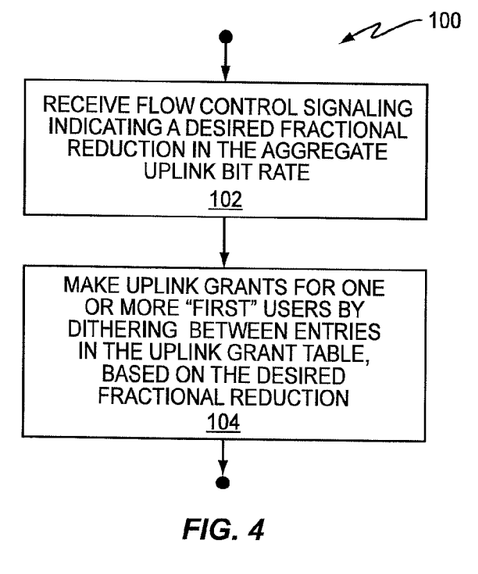
FIG. 4 is a logic flow diagram of one embodiment of a method of achieving a desired fractional reduction in aggregate uplink bit rate for a group of users, by making uplink grants for one or more of them based on dithering between entries in an AG table.

In a related diagram, FIG. 4 illustrates one embodiment of a method 100 at a wireless communication network node 12 of controlling an aggregate bit rate of uplink traffic from a plurality of users 14 supported by the node 12, to alleviate transport network congestion on a flow-controlled backhaul connection 16 of the node 12, wherein the node 12 controls the bit rate of uplink traffic from each user 14 based on making uplink grants to the user according to a defined grant table 18. In at least one embodiment, the method includes: receiving flow control signaling in cases of transport network congestion on the backhaul connection 16, said flow control signaling indicating a desired fractional reduction in the aggregate bit rate (Block 102); and making uplink grants to one or more first users in the plurality of users 14, by dithering between two or more entries 20 in the grant table 18 for each first user (Block 104). The dithering is based on the desired fractional reduction in the aggregate bit rate, so as to cause an effective uplink bit rate for each first user to take on a value not directly obtainable from the grant table, i.e., the effective maximum data rate of one or more of the first users does not map back to any single entry in the grant table 16. Note, too, that "first users" connotes a set of the users 14, which may be smaller than the overall number of users 14 being supported by the node 12.

Returning to FIG. 1 momentarily, the scheduling processor 34 in one or more embodiments is configured to dynamically adjust the number of Hybrid Automatic Repeat reQuest (HARQ) processes allowed for one or more second users, or to vary the grants made from the grant table for one or more of said HARQ processes, so as to adjust the effective uplink bit rate for each second user, in view of the desired fractional reduction in the aggregate bit rate. Here, the "second users" are selected ones of the users 14, which may be fewer in number than the overall number of users 14. In other words, the node 12 may effect the desired fractional reduction in the aggregate uplink bit rate by dithering the grants for one or more first users, and may further control the fractional reduction by adjusting the number of HARQ processes permitted for one or more second users and/or or by varying the grants made from the grant table 18 for one or more of HARQ processes that are active for given ones of the second users.

Figure 5:
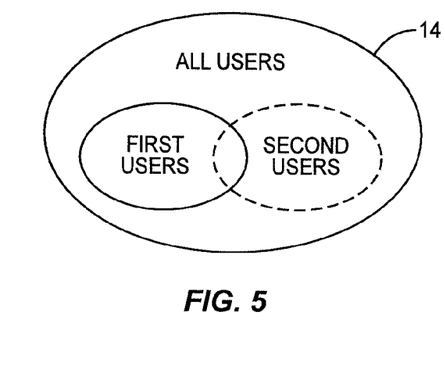
FIG. 5 is a diagram illustrating the division of users into first users having dithering applied to their AGs and second users having dithering or varying applied to the AGs used in their HARQ processes.

Note that the node 12 may treat any one or more of the users 14 as both first and second users, or it may define the set of first users separate from the set of second users—see FIG. 5. Further, in the same or another embodiment, the scheduling processor 34 is configured to dynamically adjust the data rates (of a given second user) by making different uplink grants from the grant table for different ones of the HARQ processes associated with that given second user.

Still further, in at least one embodiment, each entry 20 in the grant table 18 indirectly translates into a maximum uplink bit rate for any given user 14, and the node 12 is configured (by way of the scheduling processor 34) to determine which users in the plurality of users 14 to treat as said first users, based on determining differences between allowed uplink bit rates of the users, as dictated by flow control of the backhaul connection, and closest ones of the maximum uplink bit rates associated with the users 14. For example, the scheduling processor 34 is configured to treat any given one of the users 14 in said plurality of users 14 as a first user upon determining that the difference between the allowed uplink bit rate of the given user differs by more than a defined threshold from the closest maximum uplink bit rates for the given user. (That is, a user 14 may be treated as a first user for which grant dithering is activated, in cases where the allowed uplink bit rate for that user—as needed to accommodate the desired fractional reduction in the aggregate uplink bit rate—is relatively far away from the maximum data rates corresponding to defined entries 20 in the grant table 18.)

Figure 6:
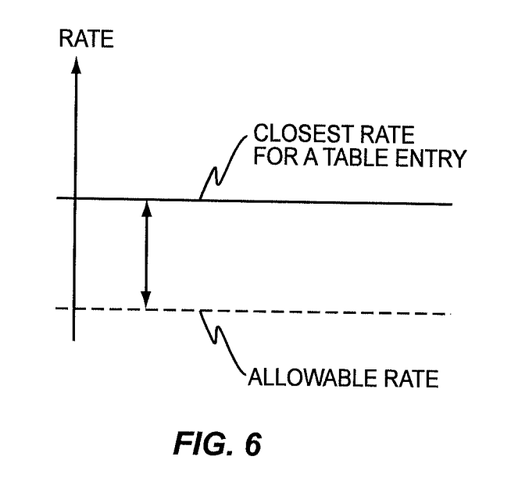
FIG. 6 is a diagram illustrating one approach for identifying users from among a plurality of users for which AG dithering will be activated.

More broadly, the first users—those selected for grant dithering—may be identified according to the distance between allowed data rates and maximum data rates directly obtainable from entries 20 in the grant table 18. (See FIG. 6.) For example, the node 12 may receive allowed bit rates for individual users 14, or may simply calculate one or more allowed bit rates based on a current aggregate uplink bit rate (e.g., a sum of the total maximum bit rates corresponding to grants based directly on the table entries 20) and the allowed bit rates that will have to be adopted to meet the desired fractional reduction. Thus, in one embodiment, the scheduling processor 34 is configured not to treat any given one of the users 14 in said plurality of users 14 as a first user, when the closest maximum uplink bit rate for that user is within a defined threshold of the allowed uplink bit rate for that user, and to instead make uplink grants to the given user using the entry 20 from the grant table 18 that corresponds to the closest maximum uplink bit rate.

Figure 7:
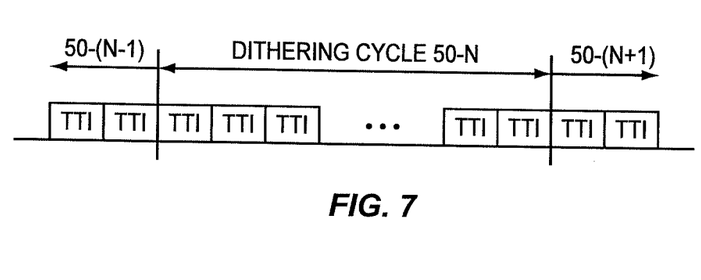
FIG. 7 is a diagram illustrating one embodiment of implementing dithering cycles within the context of recurring TTIs.
Figure 8:
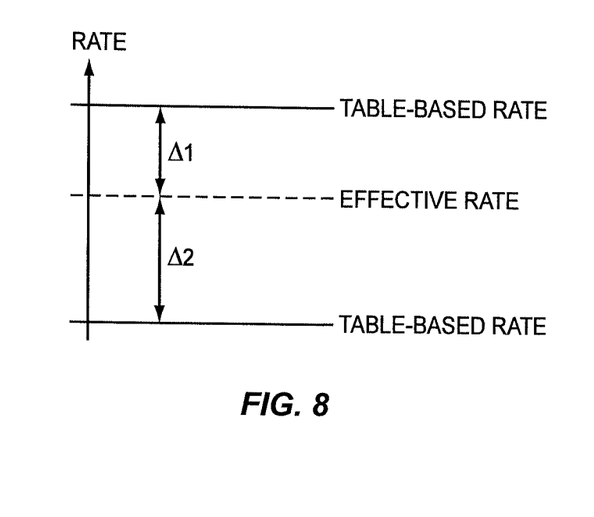
FIG. 8 is another diagram illustrating the obtainment of an effective maximum bit rate lying between two table-based bit rates, based on dithering between table-based rates.

In the same or other embodiments, the scheduling processor 34 is configured to perform said dithering over a number of transmission time intervals (TTIs) representing a dithering cycle, and wherein said dithering for each first user comprises said scheduling processor 34 making a combination of uplink grants to the first user over the dithering cycle, using two or more entries 20 from the grant table 18. FIGS. 7 and 8 illustrate this operation and its effect, wherein FIG. 7 illustrates one or more successive dithering cycles 50 (e.g., a current dithering cycle 50-N, a preceding dithering cycle 50-(N−1), and a succeeding dithering cycle 50-(N+1)). But note that the scheduling processor 34 may define different dithering cycles 50 for different users 14, or at different times.

In any case, FIG. 8 shows that the method causes any given user 14 to operate at an effective (maximum) uplink data rate that lies between table-based rates that are directly obtainable using one of the defined entries 20 in the grant table 18. Still further, in at least one embodiment, the scheduling processor 34 is configured to stop (grant) dithering for any given first user, upon detecting that the allowed uplink bit rate for the given first user is within a defined threshold of one of the maximum uplink bit rates (directly obtained from the grant table 18).

Those skilled in the art will appreciate that the above configured operations and functions may be implemented in method form, and the present invention contemplates methods for all of the above node functions and operations. Further, those skilled in the art will appreciate that such methods may be implemented using arrangements of hardware and/or software-configured processing circuits other than those depicted in the diagrams. And, on that point, those skilled in the art will appreciate that the node 12 (and RNC 40) each may include one or more computers or other microprocessor-based or digital-signal-processor-based circuits that include or are associated with a computer-readable medium storing computer program instructions, the execution of which configures such processing circuitry in accordance with the invention.

Figure 9:
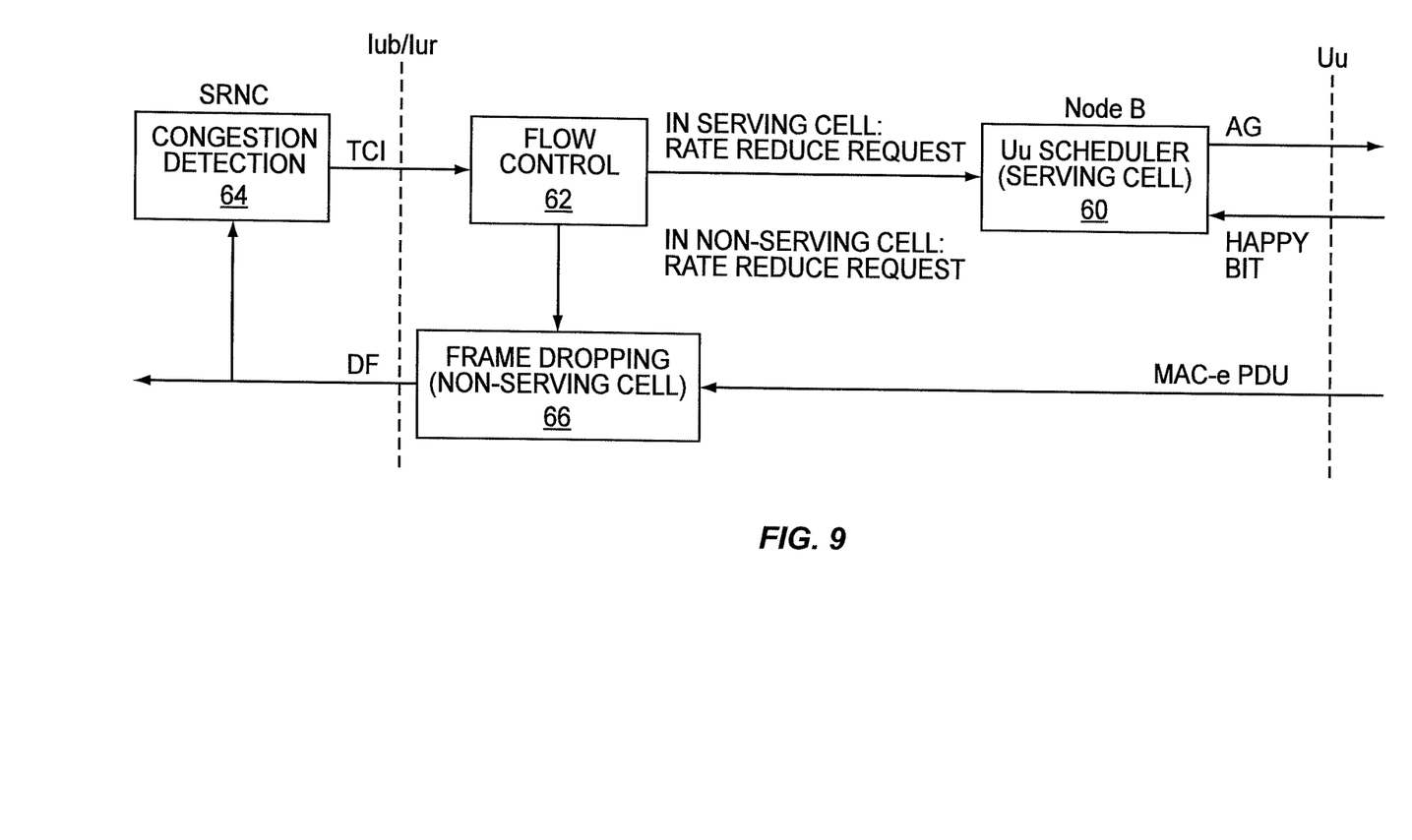
FIGS. 9 and 10 illustrate one or more function and logic arrangements implemented in WCDMA embodiments of a serving radio network controller that detects transport network and a NodeB that implements AG dithering to achieve fractional reductions in aggregate uplink bit rates, responsive to the detected congestion.
Figure 10:
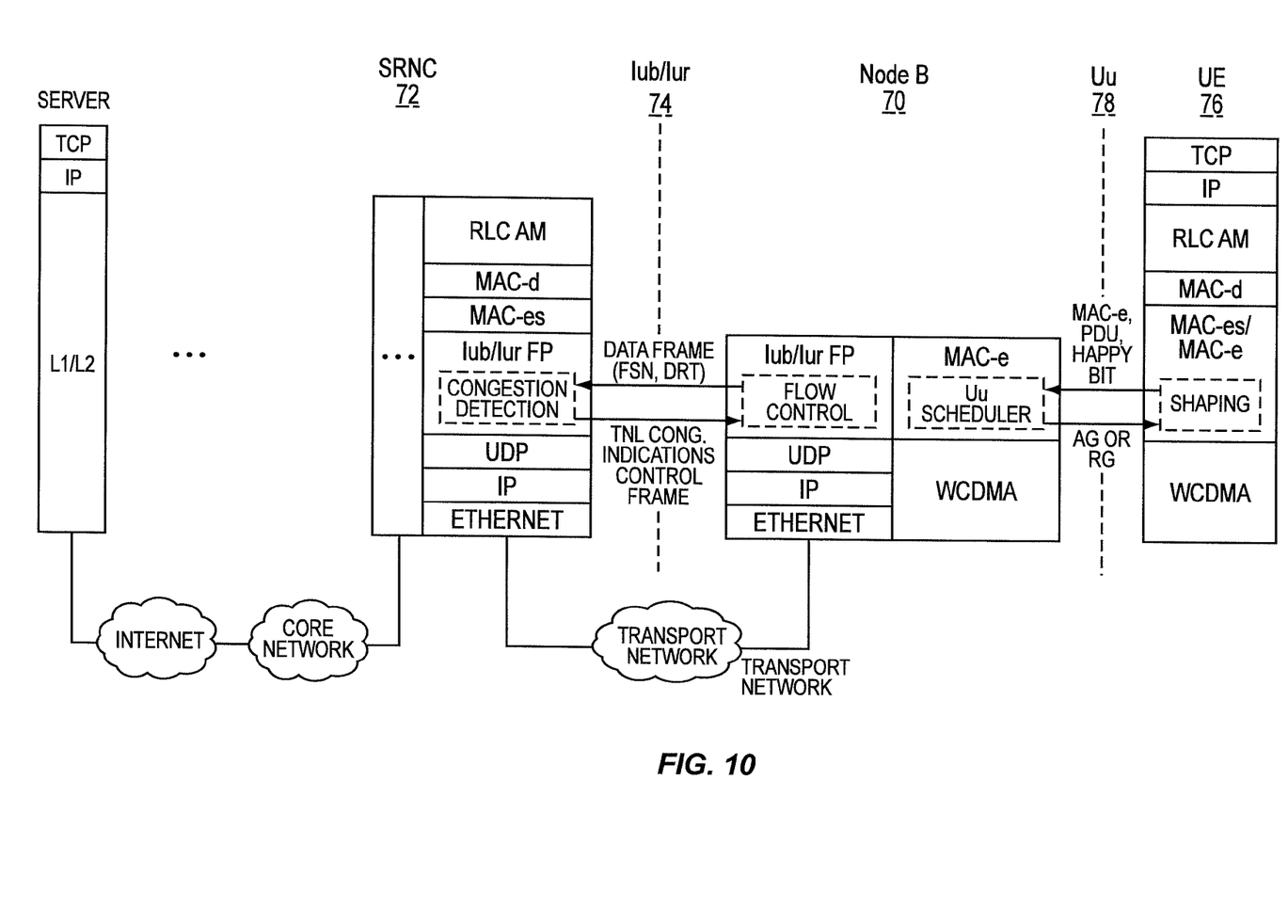

With the understanding that certain hardware and/or software structures and functions may be altered while still practicing the invention in one or more of its embodiments, FIGS. 9 and 10 show functional and/or logical implementations for one or more embodiments of the invention. In particular, FIG. 9 illustrates a WCDMA embodiment, wherein the uplink scheduler 60 in a serving cell NodeB responds to rate reduction requests from a flow control/congestion detection function 62 that is in or associated with a serving RNC 64, and which also may be associated with one or more non-serving cells 66 in the WCDMA radio network. Further in the diagram, one sees that the serving NodeB sends absolute grants (AGs) on the downlink Uu interface with one or more mobile terminals. The AGs are, as needed or desired, based on dithering between entries 20 in a grant table 18, as explained before.

FIG. 10 depicts a further example that includes more details regarding protocol stacks and logical interconnections. In particular, FIG. 10 illustrates a NodeB 70 that communicates with a serving RNC 72 through an Iub/Iur interface 74 (which is flow controlled), and that communicates with items of user equipment (UEs) 76 through a Uu interface 78. One sees that the protocol/processing stack within the RNC 72 includes a congestion detection function that provides flow control indicators to a flow control function in the protocol/processing stack of the NodeB 70. In turn, that flow control function communicates with a Uu scheduler that controls uplink scheduling via making uplink grants to the UEs. In this regard, then, the NodeB 70 may be understood as an embodiment of the node 12 first introduced in FIG. 1, wherein the depicted flow control function is a variant of the flow controller 32 described earlier, and the Uu scheduler is a variant of the scheduling processor 34 described earlier.

With these details in mind, then, in one or more embodiments the invention presented herein proposes enhancing the WCDMA EUL grant table granularity by Time Division Multiplexing (TDM) scheduling of multiple absolute grants. Instead of a fixed grant rate, the NodeB uses a (periodic) combination of two grant rates. For example, 256 kbps for 4 TTIs and 192 kbps for 1 TTI results in an effective grant rate of $(4*256+1*192)/5=243$ kbps. From the transport network point of view, as long as the period of the above AG sequence is small enough (<e.g. 50-500 ms), this sequence is equivalent to a grant of 243 kbps. This method is applicable both for 10 ms and 2 ms TTIs. The NodeB also is configured in one or more embodiments to use TDM scheduling on the HARQ process. The AG scope field indicates whether HARQ activation/de-activation will affect one or all HARQ processes. For the 2 ms TTI, the NodeB can assign different AG values for HARQ processes and hence obtain a finer granularity in the corresponding bitrates.

Thus, in the case of TN congestion, such as congestion on the Iub interface between a NodeB and its serving RNC, an EUL TN flow-control function "asks" an EUL scheduler within the NodeB to reduce the flow bitrates of one or more (or all) users with a given percentage, e.g. 10% or 50%. The task of the EUL scheduler is to take into account this reduction in its uplink grant making. To do so, the EUL scheduler can maintain an internal variable (e.g. TnCongestionAllowedRate) that represents the maximal allowed bitrate due to TN limitations. For example, if the TN is not limiting (not congested), then this variable is infinity. In case of a reduce request, this variable can be reduced (e.g. for 10% reduce request, wherein the new allowed rate can be obtained by setting TnCongestionAllowedRate=0.9×TnCongestionAllowedRate).

The EUL scheduler in one or more embodiments is configured to transform the updated bit rate allowed into a combination of AGs that when properly dithered over the given dithering intervals yields the updated bit rate. In particular, the bit rate interpolation can be implemented by a repetitive AG sequence, where a combination of two or more defined entries 20 are taken from a grant table 18, such as described earlier. If the EUL bit rate that is allowed to a user is relatively larger by a threshold, e.g. 10%, than the closest lower bit rate corresponding to an AG taken directly from a table entry 20 (denoted as "AG_lower"), and at the same time, it is relatively lower by another threshold, e.g. 10%, than a corresponding upper bit rate corresponding to another table entry 20 (denoted as "AG_upper"), then the interpolation algorithm (dithering) is activated for the user.

Let Z denote the position of the allowed bitrate between the two neighboring schedulable AG values, such that Z=("EUL allowed bitrate"−AGlower)/(AGupper−AGlower). Let N denote the number of TTIs that form one cycle of the AG repetitive sequence for obtaining the desired effective bit rate. Then compute at the NodeB the number of TTIs with the lower AG and with the upper AG as follows: N_lower=Ceil[N*Z] and N_upper=N−N_lower. Then the scheduler within the NodeB sends AG_upper for the first N_lower TTIs, and AG_lower for the next N_lower TTIs. This pattern can be repeated until the scheduled bit rate for the user remains the same. Of course, if the allowed EUL bitrate is within the relative range (specified by the above thresholds) of a schedulable AG bitrate—i.e. one directly obtained from an entry 20 in the grant table 18—then that AG is applied for all TTIs.

Still further, the scheduler in the NodeB may form dithering combinations using more than two AG values in the dithering pattern to get even finer bit rate control granularity. Additionally, or alternatively, the NodeB may use a longer dithering pattern length to increase the granularity. In at least one embodiment, the NodeB may be configured to dynamically vary the granularity it uses for obtaining effective bit rates from given users, based on the congestion conditions and the percentage adjustments needed for given congestion reductions. Further, it may use different granularities for different users.

Because dithering can increase the granting overhead, the present invention in one or more embodiments contemplates configuring more than one AG channel if TN capacity congestion problems are expected—such would be known in advance in cases, for example, where the backhaul link 16 was capacity limited relative to the expected aggregate uplink bit rate supported over the air interface 48. Additionally, or alternatively, only a subset of the users shall be scheduled using dithering. In this regard, at least one embodiment advantageously restricts grant dithering to those users having the smallest AG bit rates, because these are the users most likely to need better granularity than provided by the defined entries 20 in the grant table 18. In general, however, the additional AG channel overhead is not much of a concern in a practical sense, given the starting assumption of transport network congestion problems.

As such, the various embodiments presented herein provide for finer granularity in bit rate control for grant-based uplink data rates than can be obtained by simply making fixed AG grants from defined entries 20 in the grant table 18. Further, as noted before, finer granularity may be obtained by manipulating the HARQ processes of one or more users. In one example, bit rate interpolation (dithering) is achieved by controlling the number of HARQ processes that given users are permitted to have. For any given user, different AGs are used for different ones of the user's HARQ processes. The AG scope field indicates whether the HARQ activation/de-activation is intended for one or to all HARQ processes. Hence, in case of 2 ms TTIs, different AG assignments on different HARQ processes can result in a finer granularity in bit rate than can be achieved with the schedulable AGs alone.

As an example algorithm for such embodiments, if the allowed EUL bit rate for a given user falls in a range between two schedulable bitrates, it is relatively larger by a threshold, e.g. 12.5%, than AG_lower, and it is relatively lower by another threshold, e.g. 12.5%, than AG_upper, then the interpolation algorithm is activated for that user. Let now Z denote the ratio of allowed EUL bitrate to the schedulable upper bit rate as: Z="EUL allowed bitrate"/AG_upper. Further, assume that eight HARQ processes are available in the EUL. Then, in computing the number of processes to be used for a given user, N_grants=Floor(Z*8). Correspondingly, the NodeB scheduler sends AG_upper for the first N_grant HARQ processes and zero for the remaining ones. These grants are held for the EUL HARQ processes of the user until the allowed bit rate is obtained. On the other hand, if the allowed EUL bit rate for a given user is within the relative range (specified by the above thresholds) of a schedulable AG bit rate, then that particular AG is applied for all HARQ processes of that user.

Further, it is contemplated herein to Relative Grants (RGs) to increase/decrease the serving grant with a bit finer granularity. This method can be used, for example, when a serving-cell uses RGs in addition to AGs. For example, the EUL scheduler in a NodeB sends an AG, which it refines afterwards by sending RGs. Of course, this approach is feasible only when the RGs have finer resolution than the AGs, and it should be understood that dithered AGs can be used in combination with RGs.

In any case, the higher granularity in bit rate control provided by the teachings presented herein allow for better rate control, particularly when responding to transport network congestion. The better rate control allows fractional rate reductions that relieve the congestion condition without "over reducing" the aggregate bit rate—i.e., the invention avoids the EUL underutilization problems that can occur when bit rate reductions are relatively coarse, owing to the limited granularity available from the grant table 18. The finer granularity also reduces oscillations in the aggregate bit rate, which might otherwise arise if overly large reductions in the aggregate bit rate were made responsive to requested fractional reductions. Further, the dithering-based approach taught herein does not require any changes to the WCDMA or other standards. Of course, the present invention is not limited to application in the WCDMA context and it may be carried out in other ways than those specifically set forth herein without departing from essential characteristics of the invention. The present embodiments are to be considered in all respects as illustrative and not restrictive, and all changes coming within the meaning and equivalency range of the accompanying claims are intended to be embraced therein.

What is claimed is:

1. A method of alleviating transport network congestion on a flow-controlled backhaul connection of a wireless communications network node, wherein the method comprises:

a network node controlling an aggregate bit rate of uplink traffic from a plurality of users supported by the network node, wherein the network node controls the bit rate of uplink traffic from each user based on making uplink grants to the user according to a defined grant table;

the network node receiving flow control signaling in cases of transport network congestion on a flow-controlled backhaul connection, said flow control signaling indicating a desired fractional reduction in the aggregate bit rate of uplink traffic from the plurality of users; and the network node setting an effective uplink bit rate for a time period for one or more first users in the plurality of users based on the desired fractional reduction in the aggregate bit rate, wherein the effective uplink bit rate is not directly obtainable from the defined grant table for each first user, and wherein setting the effective uplink bit rate comprises the network node making a plurality of uplink grants over the time period using two or more uplink bit rates selected from the defined grant table for each first user.

2. The method of claim 1, further comprising the network node dynamically adjusting the number of Hybrid Automatic Repeat reQuest (HARQ) processes allowed for one or more second users in the plurality of users, or varying the grants made from a grant table for one or more of said HARQ processes, so as to adjust the effective uplink bit rate for each second user, in view of the desired fractional reduction in the aggregate bit rate.

3. The method of claim 2, wherein said dynamically adjusting comprises, for at least one second user, making different uplink grants from the defined grant table for the at least one second user for different ones of the HARQ processes associated with the at least one second user.

4. The method of claim 1, wherein each entry in the defined grant table for each first user indirectly translates into a maximum uplink bit rate for any given user, and wherein the method further comprises the network node determining which users in the plurality of users to treat as said first users, based on determining differences between allowed uplink bit rates of the users, as dictated by flow control of the backhaul connection, and the closest ones of the maximum uplink bit rates associated with the users.

5. The method of claim 4, wherein said determining comprises treating any given one of the users as a first user when the difference between the allowed uplink bit rate of the given user differs by more than a defined threshold from the closest maximum uplink bit rates for the given user.

6. The method of claim 4, further comprising not treating a given user of the plurality of users as one of the first users when the closest maximum uplink bit rate for the given user is within a defined threshold of the allowed uplink bit rate for the given user, and, instead, making uplink grants to the given user using the entry from the defined grant table that corresponds to the closest maximum uplink bit rate.

7. The method of claim 1, wherein the time period includes a dithering cycle that comprises sa number of transmission time intervals.

8. The method of claim 7, further comprising the network node ceasing setting the effective uplink bit rate for any given first user upon detecting that the allowed uplink bit rate for the given first user is within a defined threshold of one of the maximum uplink bit rates.

9. A wireless communication network node configured to alleviate transport network congestion on a flow-controlled backhaul connection of the node, wherein the node comprises:
   a communication interface to receive flow control signaling in cases of transport network congestion on the backhaul connection, said flow control signaling indicating a desired fractional reduction in the aggregate bit rate; and
   a scheduling processor configured to:
   (i) control an aggregate bit rate of uplink traffic from a plurality of users supported by a wireless network node;
   (ii) control the bit rate of uplink traffic from each user by making uplink grants to the user according to a defined grant table; and
   (iii) set an effective uplink bit rate for a time period for one or more first users in the plurality of users based on the desired fractional reduction in the aggregate bit rate, wherein the effective uplink bit rate is not directly obtainable from the defined grant table for each first user, and wherein the effective uplink bit rate is set by making a plurality of uplink grants over the time period using two or more uplink bit rates selected from the defined grant table for each first user.

10. The node of claim 9, wherein said scheduling processor is configured to dynamically adjust the number of Hybrid Automatic Repeat reQuest (HARQ) processes allowed for one or more second users in the plurality of users, or to vary the grants made from a grant table for one or more of said HARQ processes, so as to adjust the effective uplink bit rate for each second user, in view of the desired fractional reduction in the aggregate bit rate.

11. The node of claim 10, wherein said scheduling processor is configured to dynamically adjust said data rates by making different uplink grants from the grant table for different ones of the HARQ processes associated with a given second user.

12. The node of claim 9, wherein each entry in the defined grant table for each first user indirectly translates into a maximum uplink bit rate for any given user, and wherein said scheduling processor is configured to determine which users in the plurality of users to treat as said first users, based on determining differences between allowed uplink bit rates of the users, as dictated by flow control of the backhaul connection, and closest ones of the maximum uplink bit rates associated with the users.

13. The node of claim 12, wherein said scheduling processor is configured to treat any given one of the users in said plurality of users as a first user upon determining that the difference between the allowed uplink bit rate of the given user differs by more than a defined threshold from the closest maximum uplink bit rates for the given user.

14. The node of claim 12, wherein said scheduling processor is configured not to treat a given user of the plurality of users as a first user when the closest maximum uplink bit rate for the given user is within a defined threshold of the allowed uplink bit rate for the given user, and wherein said scheduling processor is configured to instead make uplink grants to the given user using the entry from the defined grant table that corresponds to the closest maximum uplink bit rate.

15. The node of claim 9, wherein the time period includes a dithering cycle comprising a number of transmission time intervals.

16. The node of claim 15, wherein said scheduling processor is configured to stop setting an effective uplink bit rate for any given first user, upon detecting that the allowed uplink bit rate for the given first user is within a defined threshold of one of the maximum uplink bit rates.

\* \* \* \* \*